United States Patent
Greenberg et al.

(10) Patent No.: US 11,030,244 B2
(45) Date of Patent: Jun. 8, 2021

(54) METHODS AND SYSTEMS FOR DATA RETRIEVAL USING AN XML CONFIGURATION FILE

(71) Applicant: ALQIMI Analytics & Intelligence, LLC, Rockville, MD (US)

(72) Inventors: Walter Greenberg, Rockville, MD (US); Kevin M. Donohue, Rockville, MD (US)

(73) Assignee: ALQIMI ANALYTICS & INTELLIGENCE, LLC, Rockville, MD (US)

( * ) Notice: Subject to any disclaimer, the term of this patent is extended or adjusted under 35 U.S.C. 154(b) by 132 days.

(21) Appl. No.: 15/224,154

(22) Filed: Jul. 29, 2016

(65) Prior Publication Data

US 2018/0032630 A1   Feb. 1, 2018

(51) Int. Cl.

| G06F 16/00 | (2019.01) |
| G06F 16/835 | (2019.01) |
| G06F 16/81 | (2019.01) |
| G06F 16/838 | (2019.01) |
| G06F 16/9535 | (2019.01) |

(52) U.S. Cl.
CPC ......... *G06F 16/8373* (2019.01); *G06F 16/81* (2019.01); *G06F 16/838* (2019.01); *G06F 16/9535* (2019.01)

(58) Field of Classification Search
CPC . G06F 16/8373; G06F 16/838; G06F 16/9535
USPC ........................................................ 707/722
See application file for complete search history.

(56) References Cited

U.S. PATENT DOCUMENTS

| 9,753,747 | B2 * | 9/2017 | Offenhartz | ................ G06F 8/38 |
| 2003/0074279 | A1 * | 4/2003 | Viswanath | .......... G06Q 30/0635 |
| | | | | 705/26.81 |
| 2004/0028212 | A1 * | 2/2004 | Lok | ........................ H04L 69/329 |
| | | | | 379/265.09 |
| 2008/0270369 | A1 * | 10/2008 | Myerson | ................ G06F 16/254 |
| 2015/0141005 | A1 * | 5/2015 | Suryavanshi | .......... H04L 67/125 |
| | | | | 455/434 |
| 2016/0301584 | A1 * | 10/2016 | Gehl | ................... H04L 43/0876 |

* cited by examiner

*Primary Examiner* — Chelcie L Daye
(74) *Attorney, Agent, or Firm* — Kenealy Vaidya LLP

(57) ABSTRACT

Some embodiments are directed to a method for exchanging data between a user and a first data source, the method including configuring a non-transitory computer readable medium to retrieve and display a first set of data from the first data source via a first data source query in accordance with connection information, a set of display options and data retrieval filters specified in a user-defined XML configuration file. The non-transitory computer readable medium further applies the user-defined XML configuration file to a second data source query to display a second set of data from a second data source in accordance with the set of display options specified for the first data source in the user-defined XML configuration file.

20 Claims, 9 Drawing Sheets

METHODS AND SYSTEMS FOR DATA RETRIEVAL USING AN XML CONFIGURATION FILE

BACKGROUND

The disclosed subject matter relates to data retrieval, and more specifically to systems and methods for displaying data retrieved from data sources on a web portal. In particular, the disclosed subject matter relates to a portal with one or more portlets that are designed to display information from diverse data sources. Retrieved data is typically presented in web pages or web-based graphical user interfaces.

Services relating to data retrieval can be implemented as software components that provide content and/or functionality to remote web applications through the Internet. Remote applications can submit requests for information to web services and receive content in return. Similarly, applications can pass queries to web services by deploying configuration files that contain information regarding the data source, various search filters and display options. A result is returned from the web service to the application based on the queries. Web service content can be passed to a client of the application where it can be displayed, processed, or otherwise utilized.

SUMMARY

The related art includes various applications for retrieving data from data sources and displaying the retrieved data on user or client terminals. However, each application can retrieve only a specific type of data or data from a specific data source. Further, such applications also need to be present locally on a user or a client terminal.

Some related art systems access data from multiple data sources and store the retrieved data in a data warehouse. The data stored on the data warehouse is then displayed on the client or user terminals. However, the data stored in the data warehouse may be in a raw format, and further formatting of the data is required before the data can be displayed. Further, data retrieval processes are generally implemented by an application server. An application server can be any software framework that facilitates the creation of web applications and a server environment to run them. It behaves as a virtual machine to run applications and handles connections to data sources on one end and connections to the client terminal or user terminal through a web client or web portal one the other. Often, using only an application server or a cluster of application servers can limit the dynamic delivery of information. Additional processing functions need to be performed by an end-user or client to obtain information in a customized format. Complex client applications are required to process the data retrieved.

Some related art systems use applications present on the client terminals to format and display retrieved data. However, such applications format the retrieved data based on predetermined algorithms without providing any option to a user to control the presentation of the retrieved data.

It may therefore be beneficial to provide systems and methods to retrieve data from one or more data sources and display the data in accordance with user-defined display options and data retrieval filters. Specifically, it may be beneficial to generate one or more portlets to facilitate retrieval of data in a legible format without using any applications stored locally on a client or user terminal. One or more portlets are generated by a portal server to facilitate a single point of access to data from data sources for end-users or clients.

It may also be beneficial to provide systems and methods to retrieve data from multiple data sources and store the retrieved data in a database in a predetermined format. The stored data is displayed in accordance with user-defined display options and data retrieval filters without the need for any local applications or programming to format the retrieved data.

It may also be beneficial to provide a specification-compliant, end-user-configurable portlet that may be generated allowing a user to quickly access and return database data using a portal server and present it in a useful format, without programming. Using a web-interface designed for a non-technical end-user, a series of data-presentation options may be selected or configured and saved to an XML (Extensible Markup Language) configuration file. A portal server, with the portlet installed, may be used to present a view of the data as per the configuration options stored in the XML configuration file. Examples of available configuration options include data retrieval filters, data export formats (XML format, Comma Separated Values or CSV format), and various levels of summary and detail.

It may also be beneficial to provide methods enabling a user to create one or more configuration files which can dictate certain display options. For example, each configuration file might correspond to a specific user's desired data feeds and/or display options.

Some embodiments are directed to a system and methods that facilitate the exchange of data between a user terminal and one or more data sources, using one or more portlets installed on a portal server.

Some embodiments are directed to a method for exchanging data between a user and a first data source, the method including configuring a non-transitory computer readable medium to access a first set of data from the first data source via a first data source query in accordance with options specified in a user-defined XML configuration file, wherein the user-defined XML configuration file can further specify a set of display options. The method might further include retrieving the first set of data from the first data source in accordance with data retrieval filters specified in the user-defined XML configuration file; and displaying the first set of data in accordance with the set of display options specified in the user-defined XML configuration file. The non-transitory computer readable medium further applies the user-defined XML configuration file to a second data source query to display a second set of data from a second data source in accordance with the set of display options specified for the first data source in the user-defined XML configuration file.

Some other methods are directed to a method of retrieving data from one or more data sources, the method including receiving a first set of display options and a first set of retrieval filters from a user through a user interface, the first set of display options and the first set of retrieval filters corresponding to a first data source; embedding the first set of retrieval filters and the first set of display options into a user-defined XML configuration file; retrieving a first set of data from the first data source in accordance with the first set of retrieval filters embedded in the user-defined XML configuration file; storing the first set of data in a database in accordance with a predefined format; generating a first portlet to display the first set of data to the user in accordance with the first set of display options and the predefined format; and generating a second portlet in order to display a second set of data retrieved from a second data source in accordance with the first set of display options embedded in the user-defined XML configuration file.

Yet other embodiments are directed to a system for exchanging data between a user and one or more data sources, the system including a web portal configured to receive a first data source query from the user, the first data source query corresponding to a first data source; a processor configured to generate a user-defined XML configuration file based on the first data source query, the user-defined XML configuration file including a first set of display options and a first set of data retrieval filters; a server configured to retrieve a first set of data from the first data source in accordance with the first set of data retrieval filters specified in the user-defined XML configuration file; store the first set of data in a database in accordance with a predefined format; generate a first portlet to display the first set of data by the web portal in accordance with the first set of display options and the predefined format; and generate a second portlet in order to display a second set of data retrieved from a second data source in accordance with the first set of display options specified in the user-defined XML configuration file.

As mentioned above, the disclosed systems and methods address a problem occurring in related art processing devices that utilize data portlets, in that there is often a lack of any form of standardization in both the portlet display presented to a user, and also in the query results returned. Additionally, inconsistencies in queries may not populate in real time in a manner expected by a user. Thus, new data (e.g., a social media feed that populates data in real time) that was previously correctly configured may return data omitting various filters, or return the data in such a way that is confusing, improperly placed, or altogether absent from the user's display.

Some of the disclosed embodiments address this problem by creating an XML configuration file for any given query and storing these files for future use. The XML configuration file can act like a cascading style sheet (CSS) for a website's display, with the exception that the configuration file can also apply data filters, query terms, etc. (in addition to display configuration parameters). Furthermore, numerous XML configuration files can be stored (e.g., one per data portal query), each of which causes the computer to provide a different display with differing returned results. These files can be compiled at the initiation of the software all at once, saving time once a user selects a given pre-determined query as the information is already downloaded and in queue.

An advantage of this approach is that the software can use the XML configuration file to spawn data portlets, configure the display, and return results consistent with the users' interests without error or delay. The file also saves the user from a trial-and-error approach of generating reliably parsed queries that can be processed in short periods of time without creating errors, latency, or inconsistency owing to differences between any particular individual search query. Such a configuration file may spare the server from continually re-generating new queries, and further save a user from having to remember the particular details of any individual query/configuration making the experience fluent, repeatable, and consistent. Previously, such consistency in a data portlet application was unavailable to a user, and could result in responses and a display that were inaccurate or unfamiliar to a user.

An additional benefit to this approach is that a user may re-use portions of the XML configuration file with modifications (such as changing one or more aspects of the query while preserving the display formatting, data sources, etc.). This can help maintain a familiar atmosphere while also giving the user the flexibility to modify the query subject, or alternatively to modify the display while maintaining the same query subject.

BRIEF DESCRIPTION OF DRAWINGS

The foregoing and other aspects of the embodiments disclosed herein are best understood from the following detailed description when read in connection with the accompanying drawings. For the purpose of illustrating the embodiments disclosed herein, there is shown in the drawings embodiments that are presently preferred, it being understood, however, that the embodiments disclosed herein are not limited to the specific instrumentalities disclosed. Included in the drawings are the following figures.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Server Environment

Figure 1A:
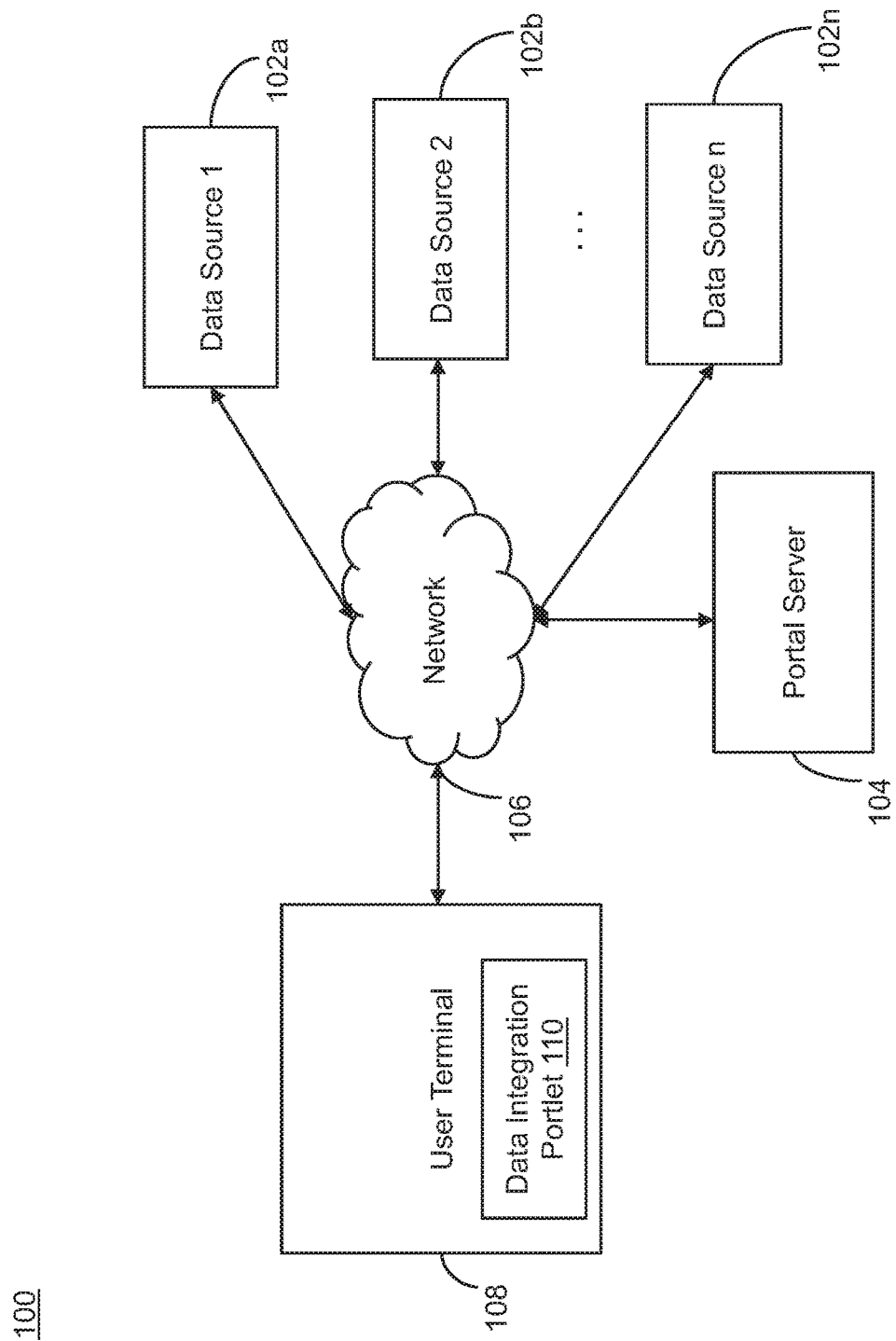
FIGS. 1A, 1B and 1C illustrate various exemplary systems for retrieving and displaying data in accordance with the disclosed subject matter.

FIG. 1A is an illustration of a system 100 in accordance with the disclosed subject matter. The system 100 is configured to retrieve and display data. Specifically, the system 100 facilitates exchange of data between a user terminal 108 (hereinafter user 108) and one or more data sources 102 through one or more portlets installed on a portal server 104. In some instances, the portal server 104 may be positioned in series with the user terminal, or may even be configured as a part of the user terminal itself (such as an app, OS routine, or the like). The data to be exchanged is retrieved in accordance with an XML configuration file that may contain various forms of information. This information can include but is not limited to connection information, display preference information, and data source query information. The XML file can also include data retrieval filters, keywords, metadata or metadata tracking information and so forth.

The data sources 102a to 102n (hereinafter collectively termed 102) are intended to be any type of data source including social media networks, search engines, portals, remote servers, network storage units, etc. Embodiments are also intended to include or otherwise cover any other type of data source. The data sources 102 are merely provided for exemplary purposes, and the various inventive aspects are intended to be applied to any type of data source on a network 106 connected to a portal server 104 and a user terminal 108 (hereinafter referred to as "the user 108").

The network 106 may include a data network such as, but not restricted to, the Internet, local area network (LAN), wide area network (WAN), metropolitan area network (MAN), etc. In certain embodiments, the communication network 106 can include a wireless network, such as, but not restricted to, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS) etc. In some embodiments, the communication network 106 may include or otherwise cover networks or subnetworks, each of which may include, for example, a wired or wireless data pathway. The communication network 106 may include a circuit-switched voice network, a packet-switched data network, or any other network capable for carrying electronic communications. For example, the network may include networks based on the Internet protocol (IP) or asynchronous transfer mode (ATM), and may support voice usage, for example, VoIP, Voice-over-ATM, or other comparable protocols used for voice data communications. In one implementation, the network includes a cellular telephone network configured to enable exchange of text or SMS messages.

Examples of the network 106 may further include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth. Embodiments are intended to include or otherwise cover any type of network, including known, related art, and/or later developed technologies to connect the data sources 102, the portal server 104 and the user 108 with each other.

The user 108 is intended to include any electronic device, such as desktop computers, portable computers, smartphones, tablet computers, wearable devices, and the like. The user 108 may also include a display unit (not shown) for displaying any data. The display unit can include, but not limited to, a Cathode Ray Tube (CRT) display, a Liquid Crystal Display (LCD), a Light Emitting Diode (LED) display, and the like. Embodiments are intended to include or otherwise cover any type of display, including known, related art, and/or later developed technologies.

Figure 1B:
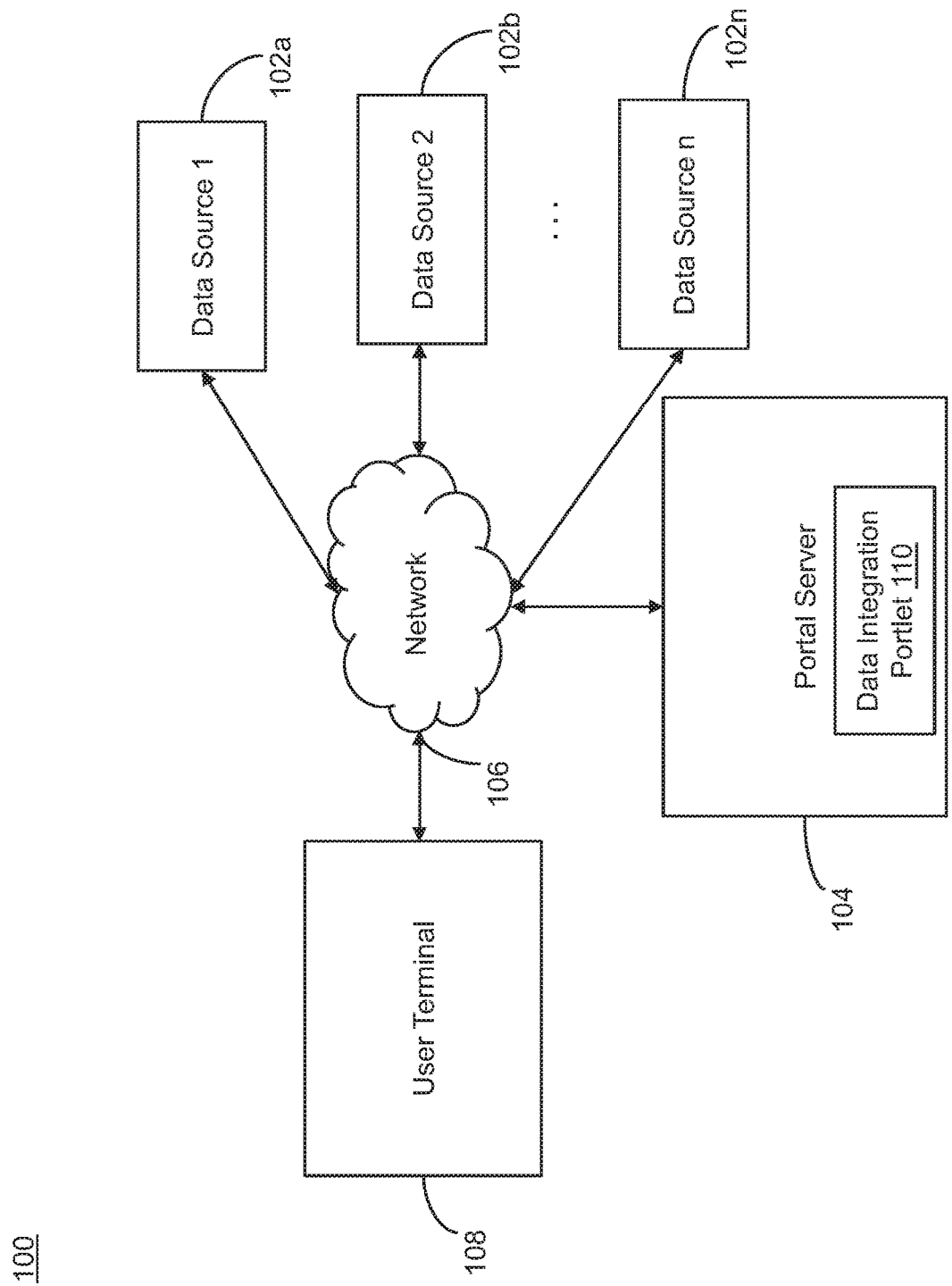
Figure 1C:
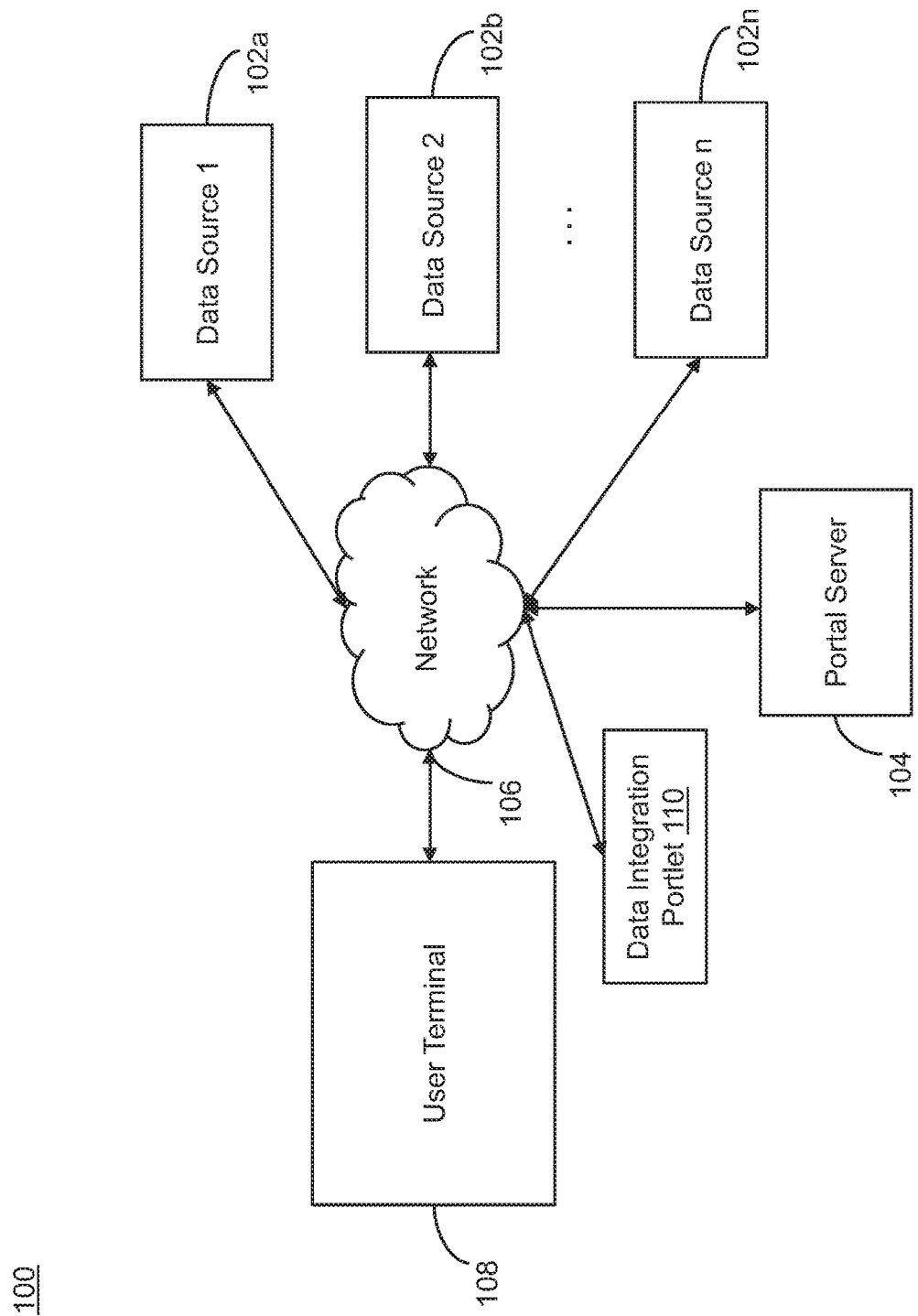

The portal server 104 generates a Data Interchange Portlet 110 (hereinafter DIP) that is a specification-compliant, end-user-configurable portlet that allows a user 108 to quickly access and return database data using a portal server and present it in a useful format, without programming beyond the generation of the XML configuration file. In some embodiments, the DIP 110 may be part of the user 108, as seen in FIG. 1A. In some other embodiments, the DIP 110 may be part of the portal server 104 (FIG. 1B) or may be placed next to the user 108 (FIG. 1C).

Through a web-interface designed for a non-technical end-user, a series of data-presentation options may be selected (configured) and saved into an XML (Extensible Markup Language) configuration file. The XML configuration file can also be manually configured. For example, the XML configuration file may be configured in a word processing application. The portal server 104, with the DIP 110 installed, is used to present a view of the data as per the configuration options stored in the XML configuration file. Examples of available configuration options include data retrieval filters, data export formats (XML format, csv format), and various levels of summary and detail. The XML configuration file may include artistic guidelines, such as displaying a three-day weather forecast in the top-left corner of a portal page, and news in the bottom-right corner the portal page. The XML file may also be arbitrarily specific, such as weather in Seattle being displayed in the top left of the portal page, while arrest reports from anyone in Miami named "Edward" being displayed in the bottom right corner of the portal page.

In some embodiments, a processor (not shown) associated with the user 108 may generate the XML configuration file and store it on a memory (not shown) associated with the user 108. Further, the portal server 104 may be communicably coupled to the user 108 in order to access the configuration options stored in the XML configuration file. In other embodiments, the processor that generates the XML configuration file may be associated with the portal server 104.

The portal can be a web portal or an enterprise portal and is configured to aggregate data from different sources and display the aggregated data. In an embodiment, the portal is a web page that brings information together from diverse sources. Each piece of information from a specific source gets a dedicated display or presentation area on the portal as defined by an end-user or web designer. The dedicated display or presentation area is handled or managed by one or more portlets. Portlets are applications used by a data portal website to receive requests from a client terminal or a user terminal and return information. In some embodiments, the portal server 104 is the middleware between an application server (not shown) and the user 108. The portal server 104 can run on top of an application server or a cluster of application servers. The application server or the cluster of application servers can host web applications related to data retrieval.

II. Portals and the Data Integration Portlet

A web portal is a specially designed web site that brings information together from diverse sources in a uniform way. Usually, each information source gets its dedicated area on the page for displaying information (a portlet); often, the end-user can configure which ones to display. Variants of portals include mashups and intranet "dashboards" for executives and managers. The extent to which content is displayed may depend on the intended end-user and the intended purpose, as well as the diversity of the content. Very often design emphasis is on a certain "metaphor" for configuring and customizing the presentation of the content and the chosen implementation framework and/or code libraries. In addition, the role of the end-user in an organization may determine which content can be added to the portal or deleted from the portal configuration.

A portal may use a search engine application program interface (API) to permit end-users to search intranet content as opposed to extranet content by restricting which domains may be searched. Apart from this common search engines feature, web portals may offer other services such as e-mail, news, stock quotes, information from databases and even entertainment content. Portals provide a way for enterprises and organizations to provide a consistent look and feel with access control and procedures for multiple applications and databases, which otherwise would have been different web entities at various uniform resource locators (URL). The features available may be restricted by whether access is by an authorized and authenticated end-user (employee member) or an anonymous site visitor.

Portal servers provide a central platform for accessing web content and resources (data, docs, apps, integrations, alerts, etc.). A core feature of a portal is to provide a central URL that permits an end-user to have a custom web experience based upon the end-users' login identity and/or settings dictated in a configuration file. This functionality is termed role-based content delivery, or RBCD, and is a main focus for portals.

Websites based on Role-based Content Delivery (RBCD) allow an enterprise to develop a central web platform. Enterprises can then advertise a single website, and thereby increase the usage of the entire enterprise's resources as the central portal can integrate or guide end-users to other resources. RBCD has allowed administrators to build portal pages for different end-user types to customize the end-user experience based on an end-user's "formal identity," such as a salesperson, engineer or manager.

Given that portal pages can include both applications (portlets and widgets) and web content, many portals have begun supporting integration to an external web content management system (WCMS) allowing content to be created or managed in a WCMS that appears in a portal page. This two-step process of adding content prompted some other portals to create an embedded WCMS.

Portals additionally have begun to focus on end-users, allowing such end-users to interact with the system. End-users are often allowed to create their own pages or sites, to add collaboration apps to those pages and to define end-user access to those pages. Many portals also enable power end-users to have added features, such as web forms, workflows, dynamic lists and polls.

This focus on enabling the end-user, combined with RBCD, allows a central site to enable both the formal organizational structure as well as the informal organizational structure (a.k.a., social collaboration) and is a major difference between portals and many WCMS systems.

Figure 2:
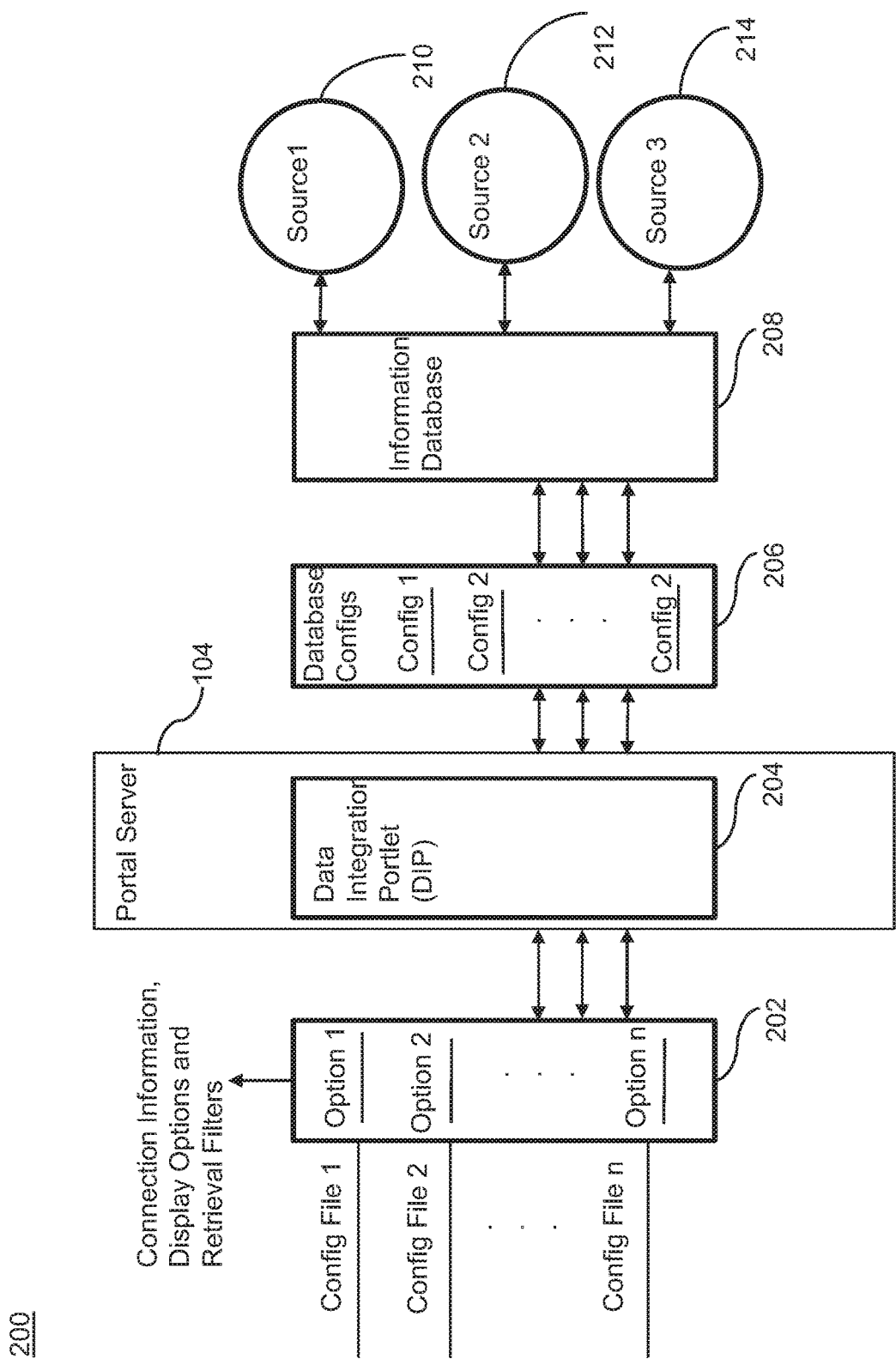
FIG. 2 illustrates a Data Integration Portlet in accordance with the disclosed subject matter.

FIG. 2 illustrates a system 200 including a Data Integration Portlet (DIP) 204, installed and placed on the portal server 104, in conjunction with the user 108, the data source 210, the data source 212 and/or the data source 214. As illustrated in FIG. 2, the user 108 can create one or more configuration files (1-N as labeled above) which will dictate certain display options. For example, each configuration file can correspond to a specific user's desired data feeds and/or display options 202 (e.g., configuration file 1 for John, configuration file 2 for Heather, and so forth). Alternatively, configuration files can correspond to different topics of interest, such as weather forecasts around a country (configuration file 1), political news (configuration file 2), etc. The configuration files can also set the display options that will ultimately appear in the portal page.

The user 108 can create queries based on the data to be retrieved. Each query can create one or more configuration files, or may use pre-existing configuration files. The queries include, but are not limited to, data retrieval filters and/or display options. The configuration file information includes connection information, display options and data retrieval filters. Connection information includes but is not limited to IP addresses, subnet masks, domain name server addresses, host name and suffix, execution parameters, system information pertaining to the user 108 and/or the portal server 104. Display options include, but are not limited to, at least one of a tabular layout, a chart layout, a news layout, a form layout, and a bullet layout. The data retrieval filters include one or more identities indicative of a data source illustrated in FIG. 2 as the data source 210, the data source 212 and/or the data source 214. The data source 210, data source 212 and/or data source 214

The portal server 104 includes a non-transitory computer readable medium that is configured to access data from the data source 210, the data source 212 and/or the data source 214. In other embodiments, the portal server 104 includes a non-transitory computer readable medium that is configured to access data from multiple data sources not limited to the data source 210, data source 212 and/or data source 214. The non-transitory computer readable medium may be a set of instructions executable by the portal server 104 to carry out various operations including, but not limited to, accessing and retrieving data, storing data, generating portlets and displaying data through the portlets. In some embodiments, the non-transitory computer readable medium can be configured by the portal server 104 to carry out various operations. Further, configuring the non-transitory computer readable medium may include executing the instructions stored therein.

The Data Integration Portlet (DIP) 204 is installed in the portal server 104. One or more XML configuration files provide connection information, user-defined display options and data retrieval filters to the portal server 104 using the DIP 204. In some embodiments, the connection information, user-defined display options and data retrieval filters form a user-defined data source query. Each XML configuration file is extracted to a configuration file database 206 and uses a single query defined by the user 108 that may extract data from multiple tables within an information database 208. In some embodiments, the information database 208 may be a relational database and/or an object-relational database. The information database 208 organizes data into one or more tables of columns and rows with a key identifying a row and/or column in each table. The keys for each row and/or column are used to define logical connections (called relationships) among the tables. Based on the user-defined queries, the data residing in the tables are manipulated such that the data is presented at the user 108 in a legible format. The data stored in multiple tables on the information database 208 is retrieved from any or a combination of the data source 210, the data source 212 and/or the data source 214. In some embodiments, the data may be retrieved in real time as per the data source query received at the portal server 104 using the DIP 204. In some other embodiments, the data may have been retrieved before a data source query is received at the portal server 104 using the DIP 204.

In some embodiments, the configuration file database 206 may be a relational database that contains the user-defined queries retrieved from the XML configuration files. The data retrieval filters and the display options are stored in one or more tables with a key identifying a row and/or column in each table. The keys are used to define logical connections or relationships among the tables.

The portal server 104 includes a set of software applications that enables generation or utilization of portals. The portal server 104 further acts as a single access point for the user 108 to retrieve data from the data source 210, the data source 212 and/or the data source 214. Data extracted by the portal server 104 is stored in an information database 208 in a predefined format. The predefined format corresponds to the data being organized in multiple tables with a key identifying a row and/or column in each table in the data. Logical connections are established between the rows and columns of one table and the rows and columns of another table.

In an embodiment, the user queries, the display options and the data retrieval filters may be obtained via a user interface which will be described in detail hereinafter.

Figure 3:
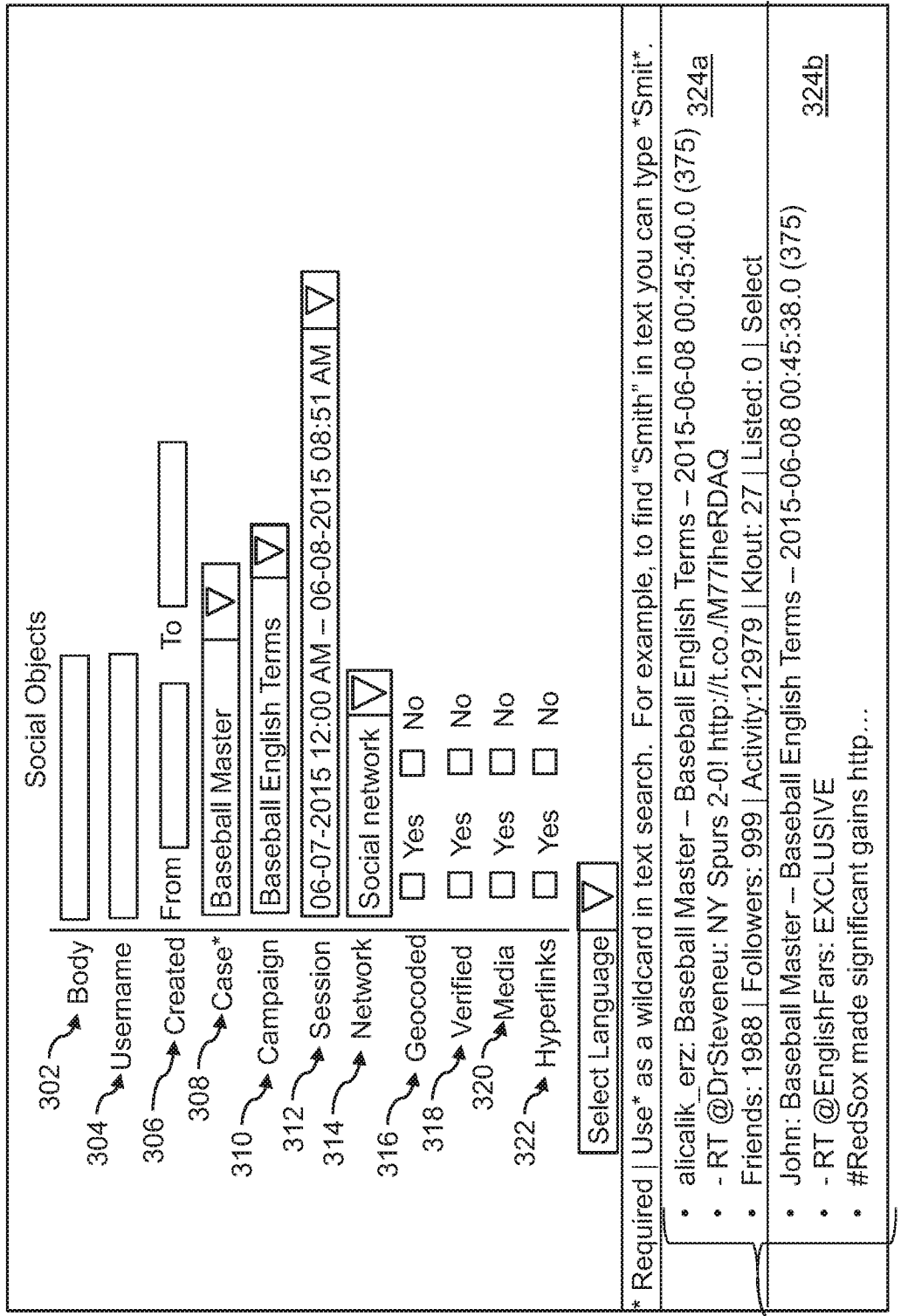
FIG. 3 is a schematic of a user interface shown on a portal page in accordance with the disclosed subject matter.

FIG. 3 illustrates an exemplary embodiment of a user interface 300 presented on the user 108. The user interface 300 includes fields for various query parameters. The fields include, but are not limited to, a body field 302, a username field 304, query creation dates field 306, a query title or case field 308, a language filter field 310, date/time stamp details field 312, a data source field 314, location filters field 316, authenticate filters field 318, flags for presentation of data in audio-visual media forms 320 and filters for hyperlinks 322. Results are displayed according to choices made in the aforementioned fields at a results field 324. In some embodiments, the results field 324 is associated with one or more portlets. Each of the fields 302 to 322 and the results field 324 correspond to one or more portlets generated by the portal server 104. Further, the results are displayed through a first portlet 324a and a second portlet 324b. The portlet 324a and the portlet 324b may be generated by the portal server 104.

Choices made on the user interface 300 form the data source query and is embedded into an Extensible Markup language (XML) configuration file stored on the user 108. An example of the information stored in the XML configuration file is shown below:

```
<QuerySettings>
    <DatabaseVendor>PostgreSQL</DatabaseVendor>
    <Connection>
        <ConnectionID>2</ConnectionID>
    </Connection>
    <QueryString>SELECT verifiedimg, verifiedyn, username,
displayname, authorkloutscore, useractivitycount, friends,
followers, listedcount, favoritescount, retweetcount,
generator, verified, profileimgurl, network, created, createdyear,
createdmonth, createdday, body, isre, origobjsrcid, objectsrcunid,
origauthor, sourceid, hashtags,
languages, expandedurls, verb, usermentionsnames, usermentionsids,
mediaurls, Ion, lat, headline,
tagline, createdby, objectcreateddate, geocoordinates,
linktoobject, resultid, Geocoded, globe, resultid, id, userbiolocation,
mediatype, usermentionsscreennames, actorid, verified, userbiolocation,
sentiment_tag, sentiment_score,
user_sentiment_votes,
user_sentiment_average, user_sentiment_mode,
user_sentiment_median, median, tsv_body
```

The above is a snippet from an exemplary XML configuration file used in accordance with the disclosed subject matter. Each XML configuration file uses a single query extracted from the input through the user interface 300 to retrieve data from multiple tables within the information database 208.

The XML configuration file is used for the processing, definition and presentation of data on the user interface 300. Through the XML configuration file, code is specified for formatting various layouts and styles pertaining to presentation of data. The XML configuration file, as seen in the sample code above, includes the user-defined query, that further includes communication information, display options and data retrieval filters, as illustrated in FIG. 2. The XML configuration file provides connection information to enable a connection between the user 108 and the information database 208 (in the current example the information database 208 being an object-relational database provided by PostgreSQL®). The "Querystring" tag provides the multiple fields shown in FIG. 3 as the fields 302 to 322. The XML configuration file further acts as a tool to transport the user-defined query information from the user 108 to the configuration file database 206 and the information database 208. Subsequently, based on the user-defined query, the portal server 104 extracts the data corresponding to the retrieval filters specified at the fields 302 to 320 from the data source specified at the data source field 314. The data is extracted in a predefined format at the information database 208. Subsequently, the extracted data is presented based on the display options specified in the user-defined query through the portlets corresponding to the results field 324 as shown in FIG. 3.

In order for a single query, such as that shown in the XML sample above, to retrieve data from multiple sources, the data would need to exist in any of the data source 210, the data source 212 and/or the data source 214 and in the information database 208 specified in the query.

The database connection details or connection information, such as that referenced in the XML code above, are specified in the same XML configuration file or a separate XML configuration file.

III. Exemplary Embodiments

In an exemplary embodiment according to the disclosed subject matter, a first XML configuration file is generated at the user 108 with a first user-defined query embedded. The first user-defined query includes connection information, data retrieval filters and display options. As shown in FIG. 3, the fields 302 to 320 in the user interface 300 are populated such that user-defined options relating to data retrieval filters and display options are specified. The user interface 300 is displayed on a display interface (not shown) that is included with the user 108. In accordance with the sample XML code above, the populated fields 302 to 320 enable selections of the query strings such that the first data source query is created and embedded into the first XML configuration file. Using the DIP 204 that is installed on the portal server 104, the first user-defined query along with other configuration information contained in the first XML configuration file is transmitted to the configuration file database 206. The information database 208, as shown in FIG. 2, stores data retrieved from the data source 210, the remote data source 212 and/or the remote data source 214. The data may be retrieved prior to the first user-defined query being received at the configuration file database 206. In some embodiments, the data may be retrieved upon receiving the first data source query. The retrieved data is stored on the information database 208 in a predefined format. The predefined format includes the retrieved data being stored in multiple tables with each row and/or column of each table being identified by a key. The keys are used to establish logical connections between rows and columns of one table in the information database 208 with the rows and columns of another table in the information database 208. Based on the first user-defined query stored in the tables of the configuration file database 206, a first set of retrieved data, corresponding to any one of the data source 210, the data source 212 and/or the data source 214, is extracted from the tables of the information database 208 and presented on the user interface 300 (as shown in FIG. 3) at the portlets corresponding to the results field 324. In some embodiments, a second user-defined query associated with a second XML configuration file and a second table on the configuration file database 206 is created by re-populating some or all of the fields 302 to 320 such that the remote data source from which data is to be retrieved is changed. The second data source query directed to present a second set of retrieved data corresponding to the data retrieval filters from the second XML configuration file in a format corresponding to the display options in the first XML file. The second set of retrieved data is associated with any of the data source 210, the data source 212 and/or the data source 214 that is not the same as the remote data source specified in the first data source query. The second set of retrieved data is displayed at the portlets corresponding to the results field 324 in addition to the first set of data. In some embodiments, the second set of retrieved data may be displayed in a separate portal page using a different portlet.

Some embodiments, in accordance with the disclosed subject matter, are directed to the system 100 that facilitates exchange of a first set of data between the data sources 102 and the user 108, using one or more portlets installed on a portal server 104. A first XML configuration file containing a first data source query is generated at the user 108. The first data source query includes data retrieval filters and display options based on which data is exchanged. A second set of data can also be exchanged through the one or more portlets installed on the portal server 104, in accordance with a second data source query in a second XML configuration file generated at the user 108 with different data retrieval filters. The second data source query may use the display options of the first data source query to display the second set of exchanged data at the user 108. In some embodiments, the display options of the first data source query are included in the second XML configuration file.

Figure 4:
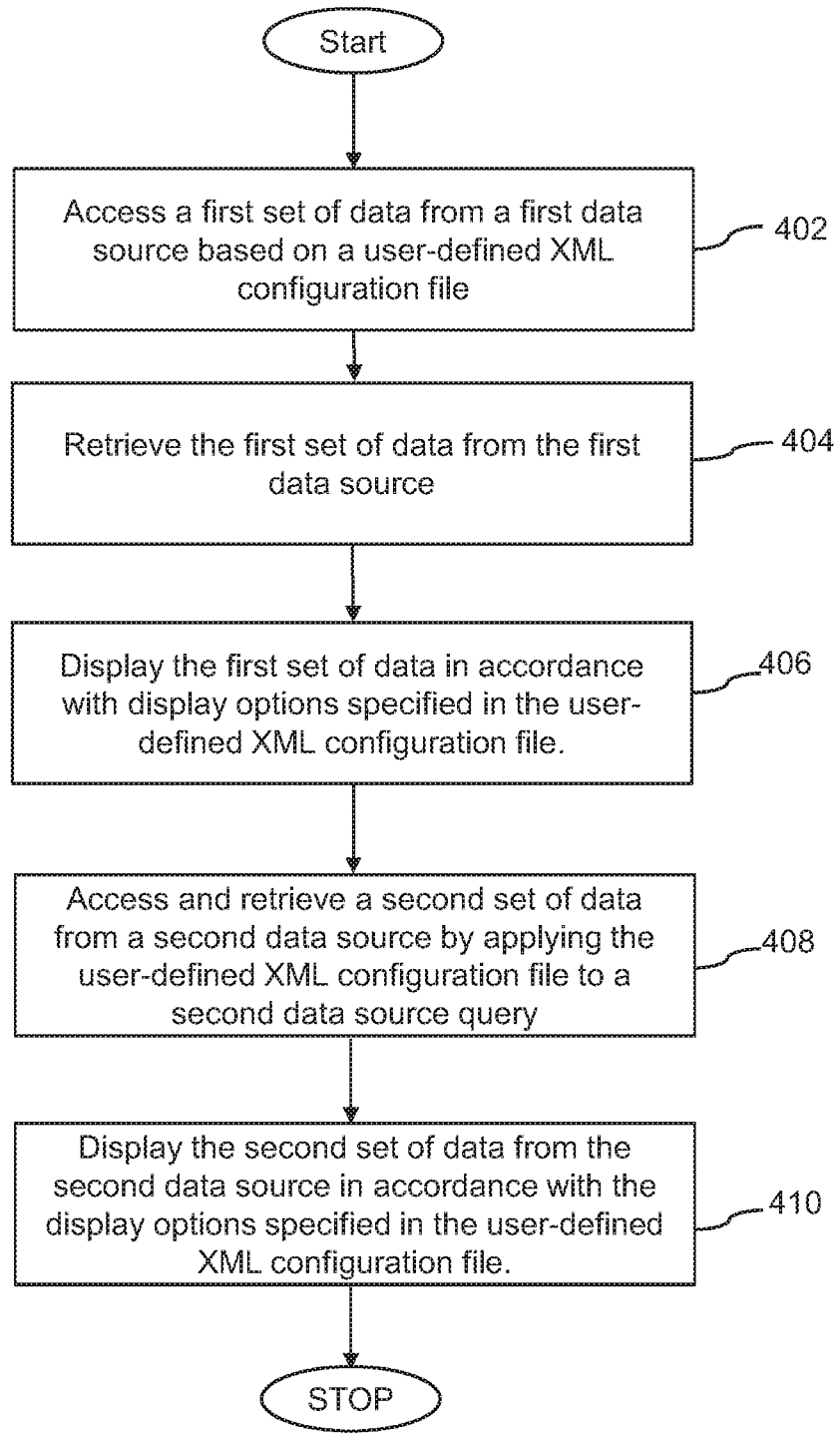
FIG. 4 is a flowchart of an exemplary method of retrieving data in accordance with the disclosed subject matter.

FIG. 4 illustrates a method 400 of retrieving data from one or more remote data source in accordance with the disclosed subject matter. This flowchart is merely provided for exemplary purposes, and embodiments are intended to include or otherwise cover any methods or procedures for data retrieval.

In accordance with the flowchart of FIG. 4, at step 402, a non-transitory computer readable medium is configured to access a first set of data from a first remote data source based on a query in a user-defined XML configuration file. In some embodiments, a processor (not shown) associated with the user 108 generates the XML configuration file and stores it on a memory (not shown) associated with the user 108. The portal server 104 includes the non-transitory computer readable medium. The data source may be selected through choices on the form-based user interface 300 and the choices are embedded into the XML configuration file stored on the user 108. At step 404, the first set of data is retrieved from the remote data source and stored in tables of the information database 208 in accordance with a predefined format. The predefined format is a presentation format that is implemented in accordance with the display options made available through the XML configuration file and subsequently the form-based user interface 300. Such a format facilitates data retrieval processes in a customized presentation as defined by the user 108. At step 406, the data stored in the information database 208 is extracted and presented on the user interface 300 through the user 108.

At step 408, the user can make changes in the query to retrieve a second set of data from a second data source in accordance with the display options specified in the XML configuration file. At step 410, the information requested is displayed accordingly. FIG. 2 further illustrates an exemplary embodiment of the aforementioned process wherein information is sought from a social network concerning a subject or topic with other filters implemented. The first data set is retrieved from the social network as shown at the results field 324. A second data source can be queried at the data source field 314. Accordingly, data pertaining to the subject or topic is displayed at the results field 324 in a tabular presentation style. The second query can be embedded in a second XML configuration file. The portal server 104 transmits the second set of data, with the display options pertaining to the first data set, to the configuration file database 206. The second set of data is saved in a predefined format at the information database 208. Based on the display options provided for the first set of data, the second set of data is presented on the user interface 300 at the results field 324. For example, the second set of data may be retrieved from a second social network. In the illustrated embodiment, data is displayed at the results field 324 though the first portlet 324*a* corresponding to the first set of data and the second portlet 324*b* corresponding to the second set of data.

Figure 5:
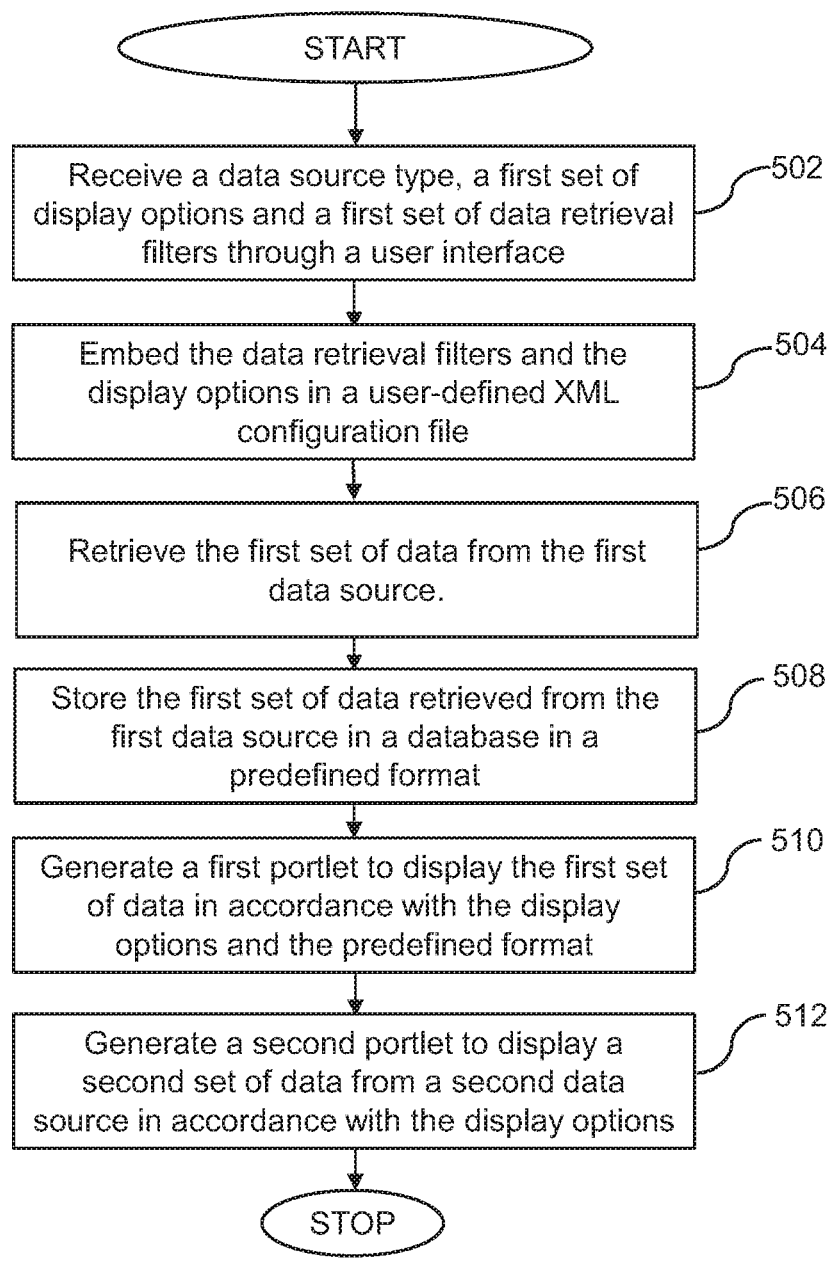
FIG. 5 is a flowchart of an exemplary method of retrieving data in accordance with the disclosed subject matter.

FIG. 5 is a flowchart of a method 500 for retrieving data from one or more data sources in accordance with the disclosed subject matter. Through the form-based user interface 300, a first query is received at step 502. The first query can include, but is not limited to, data retrieval filters and/or display options. The data retrieval filters include one or more identities indicative of a data source from one or more data sources illustrated in FIG. 2 as the data source 210, the data source 212 and/or the data source 214. The display options can include, but are not limited to, at least one of a tabular layout, a chart layout, a news layout, a form layout, and a bullet layout.

At step 504, the retrieval filters and display options are embedded in the XML configuration file. The configuration file information further includes connection information which constitute any one or a combination of IP addresses, subnet masks, domain name server addresses, host name and suffix, execution parameters, system information pertaining to user and/or the portal server 208. A first set of data is retrieved from the first data source (Step 506) and stored in a predefined format in the database 206 (Step 508). The predefined format includes all of the display options made available to the user 108 in accordance with the XML configuration file.

In accordance with the display options embedded in the XML configuration file and the predefined format, at step 510, a first portlet is generated to enable the display of the retrieved data at the user 108. In some embodiments, the retrieved data is displayed on the user interface 300 at the results field 324. In some other embodiments, the generated portlet leads to a new web page showing the retrieved data.

As seen in FIG. 3, the user interface 300 facilitates changes to be made to the first query. Changes to the first query include, but are not limited to, selecting a new data source or changing the retrieval filters. The changes form part of a second query and are embedded in a separate XML configuration file. A second data source is selected to retrieve a second set of data. The second set of data is retrieved in accordance with new query and stored on the database 206 in the predefined format. The portal server 208 transmits the retrieved data to the user 108 through a new portlet (Step 512) and displayed in accordance with the display options specified in the first query. In some embodiments, the second set of data is displayed along with the first set of data while in other embodiments a new page is created to display the second set of data.

The user interface 300 is part of a form-based portal that is generated by a form builder. The form builder is a portal page that allows an analyst level resource to create portal-based forms without writing code. There are provisions for power users to enhance the functionality provided with JavaScript. A feature of the form builder is the ability to send all or part of the data collected in the form to multiple data targets simultaneously. Included in the form builder is a forms wizard, which permits the designed form to create multiple forms and then tie them together in a wizard, to walk the end-user through a process wherein they fill data in each form sequentially and navigate through the wizard.

Some embodiments are directed toward a form builder that is generates the user interface 300. Various features of the form builder include the ability to build a complex form entirely within a Portal Environment, the ability to assign the form to one or more categories, the ability to deploy a single form or an entire category of forms to a Portal page through the form builder viewer, the ability to perform dynamic data lookups from a data visualization product (e.g., the DIP 204 as described above) to populate list oriented objects within the form configuration manager whether with a column list or a lookup from a provided static value or data from another form field.

Figure 6:
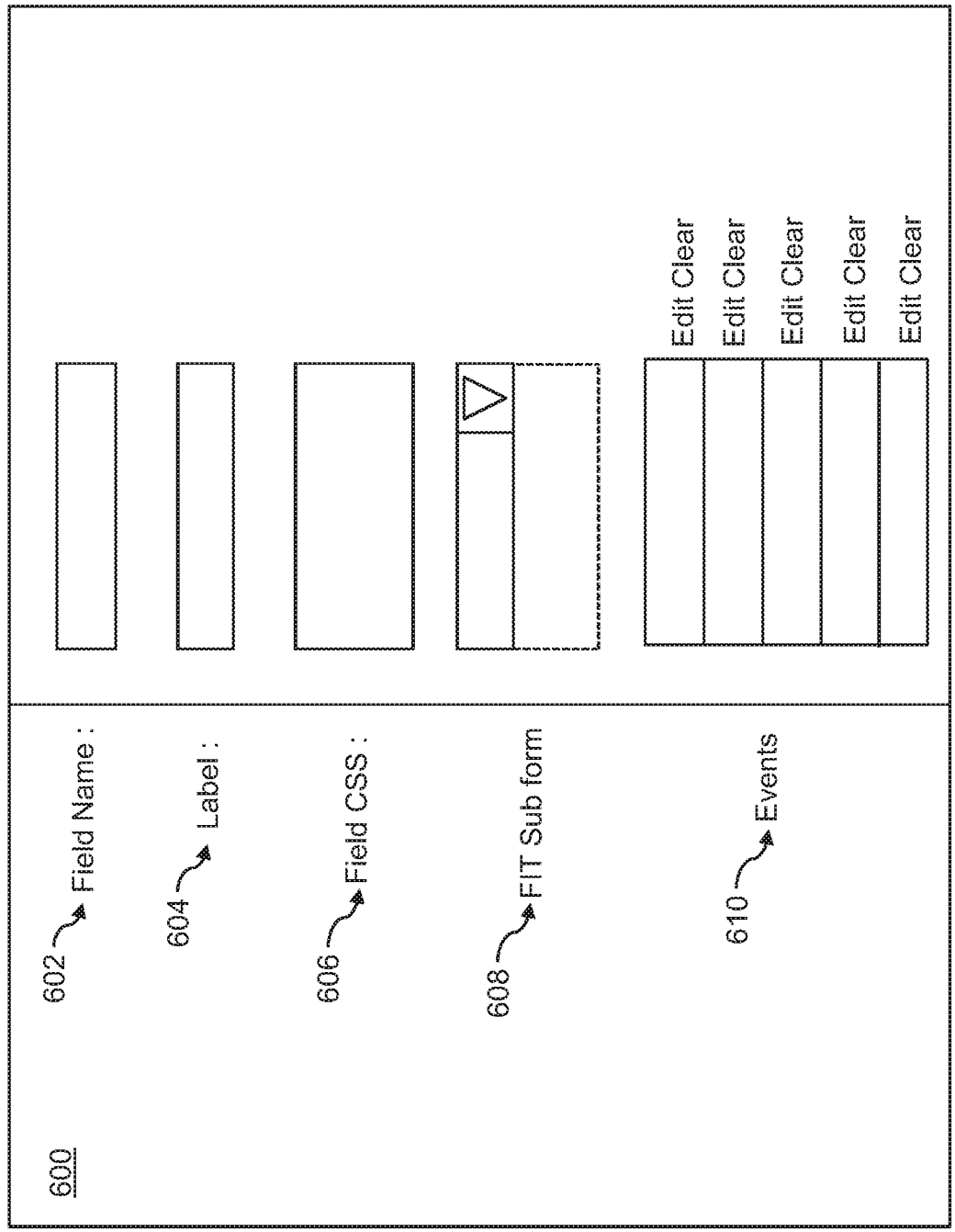
FIG. 6 is a schematic of a graphical user interface to set form and sub-form field options data in accordance with the disclosed subject matter.
Figure 7:
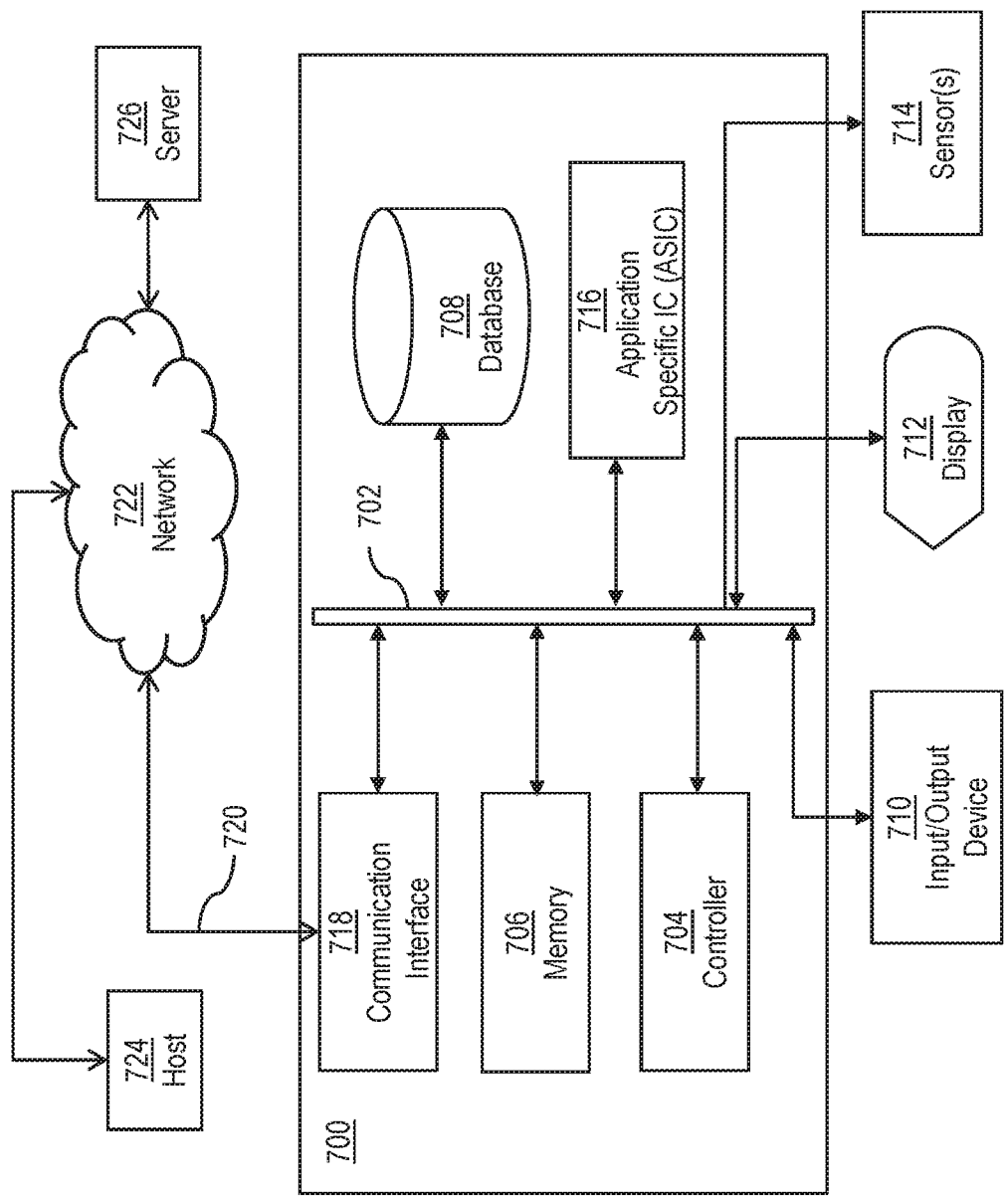
FIG. 7 is a schematic of a computer system that can be used to implement various exemplary embodiments of the disclosed subject matter.

FIG. 6 illustrates a sample toolkit 600 applicable to the form builder. There are many types of fields that can be added to a form. The fields can include static data and dynamic data in accordance with the DIP 204. A File Upload Field graphical design interface is also shown. The items that may be defined are Field Name 602 (not shown to an end user), Label 604 (as shown to the end user), Label Cascading Style Sheets (Label CSS) which is the style sheet for the Field Label, Field CSS (not shown to the end user) 606 which is the style sheet for the Field, Events 610, and form builder Subform 608 which is one of the existing forms IV. Other Exemplary Embodiments FIG. 7 illustrates a computer system 700 upon which the operation of the user 108, the DIP 204, the form builder as illustrated in FIG. 6, the configuration file database 206, the information database 208 and the portal server 104 may be implemented. Although, the computer system 700 is depicted with respect to a particular device or equipment, it is contemplated that other devices or equipment (e.g., network elements, servers, etc.) within FIG. 7 can deploy the illustrated hardware and components of system. The computer system 700 is programmed (e.g., via computer program code or instructions) to retrieve data from the data sources 102 described herein and includes a communication mechanism such as a bus 702 for passing information between other internal and external components of the computer system 700. Information (also called data) is represented as a physical expression of a measurable phenomenon, typically electric voltages, but including, in other embodiments, such phenomena as magnetic, electromagnetic (fields, photons, etc.), pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. The computer system 700, or a portion thereof, constitutes a means for performing one or more steps retrieving data from one or more data sources 102.

A bus 702 includes one or more parallel conductors of information so that information is transferred quickly among devices coupled to the bus 702. A processor 704 for processing information are coupled with the bus 702.

The processor 704 performs a set of operations on information as specified by a user. The computer program code is a set of instructions or statements providing instructions for the operation of the processor 704 and/or the computer system 700 to perform specified functions. The code, for example, may be written in a computer programming language that is compiled into a native instruction set of the processor 704. The code may also be written directly using the native instruction set (e.g., machine language). The set of operations include bringing information in from the bus 702 and placing information on the bus 702. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 704, such as a sequence of operation codes, constitute processor instructions, also called computer system instructions or, simply, computer instructions. The processor 704 may be implemented as mechanical, electrical, magnetic, optical, chemical, or quantum components, among others, alone or in combination.

The computer system 700 also includes a memory 706 coupled to the bus 702. The memory 706, such as a Random Access Memory (RAM) or any other dynamic storage device, stores information including processor instructions for storing information and instructions to be executed by the processor 704. The dynamic memory 706 allows information stored therein to be changed by the computer system 700. RAM allows a unit of information stored at a location called a memory address to be stored and retrieved independently of information at neighboring addresses. The memory 606 is also used by the processor 704 to store temporary values during execution of processor instructions. The computer system 700 also includes a Read Only Memory (ROM) or any other static storage device coupled to the bus 702 for storing static information, including instructions, that is not changed by the computer system 700. Some memory is composed of volatile storage that loses the information stored thereon when power is lost. Also coupled to the bus 702 is a non-volatile (persistent) storage device 708, such as a magnetic disk, a solid state disk, optical disk or flash card, for storing information, including instructions, that persists even when the computer system 700 is turned off or otherwise loses power.

Information, including instructions for inspecting the XML data source query files is provided to the bus 702 for use by the controller 704 from an external input/output device 710. From an input perspective, the input/output device could include one or more elements such as a keyboard containing alphanumeric keys operated by a human user, a mouse, trackball, microphone, an Infrared (IR) remote control, a joystick, a game pad, a stylus pen, a touch screen, or any other of an input/output device. These devices can be capable of controlling a position of a small cursor image presented on the display 712 and issuing commands associated with graphical elements presented on the display 712.

From an output perspective, the input/output device 710 could include a Cathode Ray Tube (CRT), a Liquid Crystal Display (LCD), a Light Emitting Diode (LED) display, an organic LED (OLED) display, an active matrix display, an Electrophoretic Display (EPD), a plasma screen, or a printer for presenting text or images. Additionally, a separate display 712 may also include any of the previously mentioned devices or any other devices capable of visually, audibly, or even by means of touch, scent, etc. to provide output data to a user. Further, the display 712 may be a touch enabled display such as capacitive or resistive screen. In some embodiments, for example, in embodiments in which the computer system 700 performs all functions automatically without human input, one or more of the external input/output device(s) 710, and the display 712 may be omitted.

Sensors 714 may be provided as components of the input/output device 710, or may be provided as independent components to the system 700. The sensor(s) 714 may detect conditions in its vicinity and transforms those detections into physical expressions compatible with the measurable phenomenon used to represent information in the computer system 700 such as capturing, recording and causing to store one or more still and/or moving images (e.g., videos, movies, etc.) which also may comprise audio recordings. Sensors 714 may also detect elements such as motion, temperature, imagery or video, etc.

Other external devices can also be coupled to the bus 702 such as an Application Specific IC (ASIC) device 716. In the illustrated embodiment, special purpose hardware such as the ASIC 716 might serve as special purpose hardware configured to perform operations not performed by the controller 704 quickly enough for various purposes. Examples of ASICs include graphics accelerator cards for generating images for the display 712, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

The computer system 700 also includes one or more instances of a communication interface 718 coupled to the bus 702. The communication interface 718 provides a one-way or two-way communication coupling to a variety of external devices that operate with their own processors, such as printers, scanners and external disks. In general, the coupling is with a network link 720 that is connected to a local network 722 to which a variety of external devices with their own processors are connected. For example, the communication interface 718 may be a parallel port or a serial port or a Universal Serial Bus (USB) port on a personal computer. In some embodiments, the communication interface 718 is an Integrated Services Digital Network (ISDN) card, a Digital Subscriber Line (DSL) card, or a telephone modem that provides an information communication connection to a corresponding type of a telephone line. In some embodiments, the communication interface 718 is a cable modem that converts signals on the bus 702 into signals for a communication connection over a coaxial cable or into optical signals for a communication connection over a fiber optic cable. As another example, the communication interface 718 may be a Local Area Network (LAN) card to provide a data communication connection to a compatible LAN, such as Ethernet™ or an Asynchronous Transfer Mode (ATM) network. In one embodiment, wireless links may also be implemented. For wireless links, the communication interface 718 sends or receives or both sends and receives electrical, acoustic or electromagnetic signals, including infrared and optical signals that carry information streams, such as digital data. For example, in wireless handheld devices, such as mobile telephones like cell phones, the communication interface 718 includes a radio band electromagnetic transmitter and receiver called a radio transceiver. In certain embodiments, the communication interface 718 enables connection to the communication network 106 for inspecting the user queries in the XML configuration files. Further, the communication interface 718 can include peripheral interface devices, such as a thunderbolt interface, a Personal Computer Memory Card International Association (PCMCIA) interface, etc. Although a single communication interface 718 is depicted, multiple communication interfaces can also be employed.

The term "computer-readable medium" as used herein refers to any medium that participates in providing information to the processor 704, including instructions for execution. Such a medium may take many forms, including, but not limited to, computer-readable storage medium (e.g., non-volatile media, volatile media), and transmission media. Non-transitory media, such as non-volatile media, include, for example, optical or magnetic disks, such as the storage device 708. Volatile media include, for example, the dynamic memory 706. Transmission media include, for example, twisted pair cables, coaxial cables, copper wire, fiber optic cables, and carrier waves that travel through space without wires or cables, such as acoustic waves, optical or electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a USB flash drive, a Blu-ray disk, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 716.

The network link 720 typically provides information communication using transmission media through one or more networks to other devices that use or process the information. For example, the network link 720 may provide a connection through the local network 722 to a host computer 724 or to ISP equipment operated by an Internet Service Provider (ISP).

A computer called a server host 726, connected to the Internet, hosts a process that provides a service in response to information received over the Internet. For example, the server 726 hosts a process that provides information representing video data for presentation at the display 712. It is contemplated that the components of the computer system 700 can be deployed in various configurations within other computer systems, e.g., the host 724 and the server 726.

At least some embodiments of the invention are related to the use of the computer system 700 for implementing some or all of the techniques described herein. According to one embodiment of the invention, those techniques are performed by the computer system 700 in response to the processor 704 executing one or more sequences of one or more processor instructions contained in the memory 706. Such instructions, also called computer instructions, software and program code, may be read into the memory 706 from another computer-readable medium such as the storage device 708 or the network link 720. Execution of the sequences of instructions contained in the memory 706 causes the processor 704 to perform one or more of the method steps described herein. In alternative embodiments, hardware, such as the ASIC 716, may be used in place of or in combination with software to implement the invention. Thus, embodiments of the invention are not limited to any specific combination of hardware and software, unless otherwise explicitly stated herein.

Various forms of computer readable media may be involved in carrying one or more sequence of instructions or data or both to the processor 704 for execution. For example, instructions and data may initially be carried on a magnetic disk of a remote computer such as the host 724. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 720. An infrared detector serving as the communication interface 718 receives the instructions and data carried in the infrared signal and places information representing the instructions and data onto the bus 702. The bus 702 carries the information to the memory 706 from which the processor 704 retrieves and executes the instructions using some of the data sent with the instructions. The instructions and data received in the memory 706 may optionally be stored on the storage device 708, either before or after execution by the processor 704.

V. Alternative Embodiments

While certain embodiments of the invention are described above, and FIGS. 1-7 disclose the best mode for practicing the various inventive aspects, it should be understood that the invention can be embodied and configured in many different ways without departing from the spirit and scope of the invention.

For example, embodiments are disclosed above in the context of retrieving data from one or more data sources based on user queries embedded in XML configuration files. However, embodiments are intended to include or otherwise cover any type of configuration file.

Embodiments as disclosed above allow retrieval of data from different data sources and display the data as per user-defined display options and data retrieval filters through a portal server and an associated portal. Embodiments of the present disclosure further enable the portal server to be a single point of access in data retrieval and display without using any additional resources or applications on an end-user terminal.

Embodiments, as disclosed above, are directed to the system 100 that facilitates exchange of a first set of data between the data sources 102 and the user 108, using one or more portlets installed on a portal server 104. A first XML configuration file containing a first data source query is generated at the user 108. The first data source query includes data retrieval filters and display options based on which data is exchanged. The system 100 facilitates exchange of data between the user 108 and the data sources 102 through one or more portlets installed on the portal server 104. The data to be exchanged is retrieved in accordance with the first XML configuration file containing connection information and the first data source query that includes display options and data retrieval filters. A second set of data can also be exchanged through the one or more portlets installed on the portal server 104, in accordance with a second data source query in a second XML configuration file generated at the user 108 with different data retrieval filters. The second data source query may use the display options of the first data source query to display the second set of exchanged data at the user 108. In some embodiments, the display options of the first data source query are included in the second XML configuration file.

Embodiments are also intended to cover storing retrieved data in any predefined format in a database associated with the portal server such that the data can be displayed through portlets generated by the portal server. The predefined format can be based on a type of data source and user-defined data fields provided in an XML configuration file.

Embodiments are also intended to cover any form building toolkit that allows creation of forms without coding for a portal page. The forms can be used to receive options from a user and display data.

Exemplary embodiments are intended to cover all software or computer programs capable of enabling processors to implement the above operations, designs and determinations. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary embodiments disclosed above.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Some of the disclosed embodiments include or otherwise involve data transfer over a network, such as communicating various inputs over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network may include multiple networks or subnetworks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of a network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A method for exchanging data between a user and a first data source, the method comprising:
    configuring a non-transitory computer readable medium to access a first set of data from the first data source via a first data source query in accordance with a set of data retrieval filters specified in a first user-defined XML configuration file, the first user-defined XML configuration file further specifying a first set of display options;
    retrieving the first set of data from the first data source in accordance with connection information that includes a URL and an IP address, system information of the user, system information of the data source, execution parameters, and data retrieval filters that include one or more identities indicative of the first data source and instructions to extract the first set of data specified in the first user-defined XML configuration file;
    displaying the first set of data in accordance with the first set of display options specified in the first user-defined XML configuration file; and
    applying, via the non-transitory computer readable medium, a second user-defined XML configuration file to a second data source query to display a second set of data from a second data source in accordance with the first set of display options specified for the first data source in the first user-defined XML configuration file.

2. The method of claim 1, further comprising displaying the first set of data and the second set of data on one or more portlets on a portal.

3. The method of claim 1, wherein at least one of the first data source and the second data source comprises information related to social media.

4. The method of claim 1, further comprising receiving the first data source query and the second data source query from a portal page.

5. The method of claim 1, further comprising storing the user-defined XML configuration file in a memory local to the user.

6. The method of claim 1, wherein the first data source query comprises one or more identities indicative of the first data source, one or more sets of keywords, and the first set of display options.

7. The method of claim 1, wherein the first set of display options further comprises at least one of a tabular layout, a chart layout, a news layout, a form layout, and a bullet layout for displaying the first set of data.

8. The method of claim 1, further comprising storing the first set of data and the second set of data in a server database in a predefined format.

9. The method of claim 1, further comprising accessing connection information stored in the user-defined XML configuration file to retrieve the first set of data.

10. A method of retrieving data from one or more data sources, the method comprising:
    receiving a first set of display options, a first set of data retrieval filters that include one or more identities indicative of a data source and instructions to extract a set of data, and a first set of connection information that includes a URL and an IP address from a user via a user interface, system information of the user, system information of the data source, execution parameters, the first set of display options, the first set of data retrieval filters, and the first set of connection information corresponding to a first data source;
    embedding the first set of data retrieval filters and the first set of display options into a first user-defined XML configuration file;
    retrieving a first set of data from the first data source in accordance with the first set of data retrieval filters embedded in the first user-defined XML configuration file;
    storing the first set of data in a database in accordance with a predefined format;
    generating a first portlet to display the first set of data to the user in accordance with the first set of display options and the predefined format; and
    generating a second portlet in order to display a second set of data retrieved from a second data source by a second user-defined XML configuration file in accordance with the first set of display options embedded in the first user-defined XML configuration file.

11. The method of claim 10, wherein at least one of the first data source and the second data source comprises information related to social media.

12. The method of claim 10, wherein the data retrieval filters comprise at least one data source identifier and one or more keywords.

13. The method of claim 10, further comprising storing the user-defined XML configuration file in a memory local to the user.

14. The method of claim 10, wherein the display options comprise at least one of a tabular layout, chart layout, news layout, form layout and bullet layouts.

15. The method of claim 10, wherein the first set of data and the second set of data is retrieved via a portal server associated with the database.

16. The method of claim 10, further comprising accessing connection information stored in the user-defined XML configuration file to retrieve the first set of data.

17. The method of claim 10, further comprising accessing connection information stored in the user-defined XML configuration file to retrieve the second set of data.

18. A system for exchanging data between a user and one or more data sources, the system comprising:
    a web portal configured to receive a first data source query from the user, the first data source query corresponding to a first data source;
    a processor configured to generate a first user-defined XML configuration file based on the first data source query, the first user-defined XML configuration file including a first set of display options and a first set of data retrieval filters that include one or more identities indicative of the first data source and instructions to extract a set of data and connection information that includes a URL and an IP address, system information of the user, system information of the first data source, and execution parameters; and a portal server communicably coupled to the web portal, the portal server configured to:

retrieve a first set of data from the first data source in accordance with the first set of data retrieval filters specified in the first user-defined XML configuration file;

store the first set of data in a database in accordance with a predefined format;

generate a first portlet to display the first set of data by the web portal in accordance with the first set of display options and the predefined format; and generate a second portlet in order to display a second set of data retrieved from a second data source by a second user-defined XML configuration file in accordance with the first set of display options specified in the first user-defined XML configuration file.

19. The system of claim 18, wherein the portal server is further configured to access connection information stored in the user-defined XML configuration file to retrieve the first set of data.

20. The system of claim 18, wherein the processor is further configured to store the user-defined XML configuration file in a memory local to the user.

* * * * *